March 30, 1926.                                                          1,578,571
D. J. ANGUS
VOLT AMPERE METER
Original Filed Jan. 27, 1922
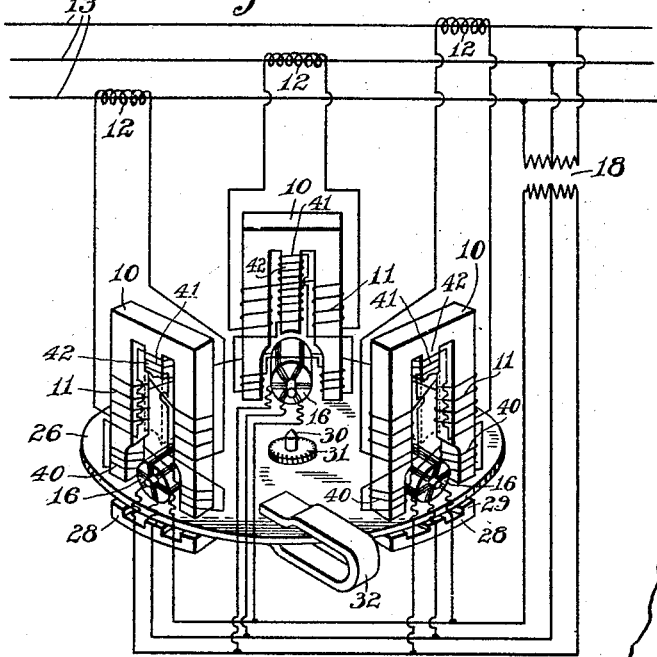
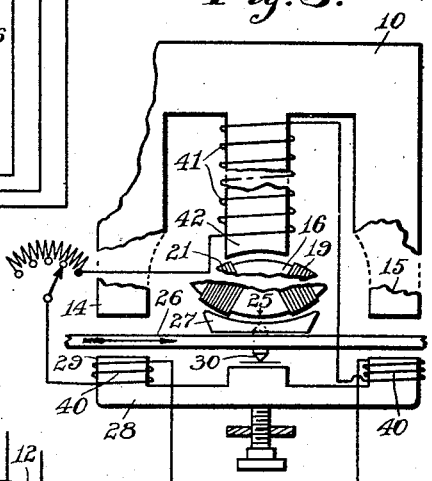
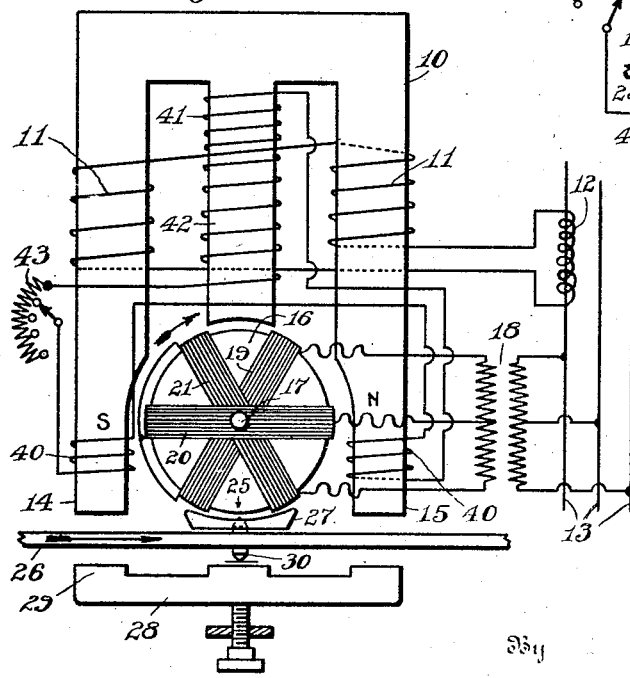
Inventor
Donald J. Angus,
G. B. Schley.
Attorney Patented Mar. 30, 1926.

1,578,571

UNITED STATES PATENT OFFICE.

DONALD J. ANGUS, OF INDIANAPOLIS, INDIANA, ASSIGNOR TO WESTINGHOUSE ELECTRIC & MANUFACTURING COMPANY, A CORPORATION OF PENNSYLVANIA.

VOLT-AMPERE METER.

Application filed January 27, 1922, Serial No. 532,070. Renewed June 23, 1925.

*To all whom it may concern:*

Be it known that I, DONALD J. ANGUS, a citizen of the United States, residing at Indianapolis, in the county of Marion and State of Indiana, have invented a new and useful Volt-Ampere Meter, of which the following is a specification.

It is the object of my invention to measure the volt-amperes of an alternating-current circuit.

In practicing my invention, I provide a structure in which one or more actuators act on a meter disk. Each actuator comprises a field magnet having poles in proximity to the meter disk, and a rotatably shiftable armature between the poles adjacent to the meter disk; one of the elements of each actuator being excited in proportion to the voltage and the other in proportion to the current of an alternating-current circuit, and one of them, the armature, being excited to produce a rotating or shifting field.

With the arrangement above briefly described, the rotating-field armature flux divides where it passes from the armature into the field-magnet poles, part of the flux passing through the field magnet from one pole thereof to the other without cutting the disk, while the other part cuts the meter disk in the same way as does the field-magnet flux.

This latter part of the armature flux is in quadrature with that armature flux which passes directly from the armature through the meter disk. As a result, the armature flux has an effect on the meter disk entirely independent of the field-magnet flux, and will produce a movement of the meter disk even though the field-magnet flux is reduced to zero. This effect is compensated for by opposing that part of the armature flux which cuts the disk at the magnet poles by a magneto-motive force substantially equal thereto. I do this by placing coils which surround the path of the armature flux which cuts the disk at the magnet poles, such coils conveniently being either on the poles of the field magnet or on a reluctance-reducing member which I preferably provide on the opposite side of the meter disk from the actuator proper; and I excite these coils from a generating coil suitably mounted so that a voltage is induced in it from the rotating field of the armature; and so arrange this last-named coil, and proportion the several coils, that the magneto-motive force produced by the coils will be in substantial opposition, and of substantially the proper magnitude, to nullify the armature flux tending to cut the disk at the magnet poles.

As a result of the above described construction, the armature rotatably shifts upon changes in the power-factor of the circuit to maintain a fixed phase relationship between the fields of the field magnet and the armature, and to thus maintain a fixed phase relationship between the fluxes which cut the meter disk and are produced by such field magnet and armature respectively.

The accompanying drawings illustrate my invention: Fig. 1 is a perspective view, in semi-diagrammatic form, of an integrating three-phase volt-ampere meter embodying my invention, in a preferred form, with the electrical connections diagrammatically indicated; Fig. 2 is a semi-diagrammatic face view of an actuator embodying my invention, with a fragment of the associated meter disk, with the flux-opposing coils on the field-magnet poles; Fig. 3 is a fragmentary view similar to Fig. 2, omitting some of the parts, with the flux-opposing coils mounted on the reluctance-reducing member.

The meter has one or more actuators, hereinafter described, for moving a meter element. These may be varied in number, Fig. 1 showing three actuators and Fig. 2 showing one. The actuators, when more than one is used, are preferably all alike, save that the current (or the voltage) elements of the several actuators are connected to different current-phases as indicated in Fig. 1. It is necessary to describe only a single actuator, in which I shall assume the armature to have the voltage winding and the field magnet the current winding, with the winding producing a rotating field on the armature.

Such actuator has a field magnet 10 with an exciting winding 11, here connected, through a current transformer 12 as shown, to carry a current proportional to that in a leg of the alternating-current circuit 13, shown as a three-phase circuit. Between the two pole pieces 14 and 15 of the field magnet 10 is an armature 16, mounted so that it can shift rotatably on an axis 17.

This armature is here provided with exciting windings excited in proportion to the voltage of the circuit 13, as shown through a voltage transformer 18. These exciting windings are divided into three parts 19, 20, and 21, in proper relation to produce a rotating field, which is assumed to rotate in the direction of the arrow in Fig. 2.

The connections shown are for a three-phase circuit, but may be modified for circuits with different numbers of phases.

Arranged in proximity to the pole pieces 14 and 15 of the field magnet 10, and to the armature 16 at a point 25 midway between such pole pieces, is a meter disk 26, still referring to the specific embodiment of my invention shown. This meter disk is in inductive relation to the pole pieces 14 and 15 and to the point 25, so that eddy currents are induced in it by the flux from these points. If desired, a special fixed pole member 27 may be provided between the armature 16 and the disk 26, and on the opposite side of the disk 26 from the field magnet 10 and armature 16 is a member 28 of magnetic material for reducing the reluctances of the various magnetic circuits. The member 28 is preferably adjustable toward and from the disk 26, for purposes of calibration, and is provided with fingers 29 projecting toward the disk opposite the pole pieces 14 and 15 and the point 25. The disk 26 is any suitable meter disk, for an integrating or an indicating or a recording meter as desired, being suitably mounted on pivot pins 30, and being shown in Fig. 1 as having a pinion 31 by which it may be connected to integrating mechanism through suitable gearing. The disk 26 is restrained in its movements, ordinarily by drag magnets 32 when the disk is an integrating meter as illustrated.

In operation, the armature 16 is free to move on its axis 17, but does not completely rotate thereon, merely changing position on its axis as the relative phase position of the current and voltage—that is, the power-factor—of the circuit 13 changes. This change of position is such, by reason of the reaction between the magnetic fields of the field-magnet and the armature, that the voltage-produced magnetic flux of the rotating field will be in line with the current-produced magnetic flux between the poles of the field magnet when the latter is at its maximum value, regardless of the power factor. Consequently the voltage-produced flux at the point 25 will be 90° out of phase with the current-produced field-magnet flux. In other words, the rotating field of the armature is always kept in phase with the field of the field-magnet with respect to a line through the poles of the field magnet regardless of the power-factor of the circuit, and so always in quadrature with such field-magnet field with respect to a line at right angles to such line through the field-magnet poles.

In consequence of this, assuming the field rotation to be in the direction of the arrow, there is a progressive pole travel, of the two poles alternately, from the pole piece 14 to the point 25 and then to the pole piece 15. The point 25 is a point in space on the armature midway between the two pole pieces 14 and 15, regardless of the position the armature itself takes, and the progressive pole travel referred to takes place uniformly for all positions the armature may assume, and regardless of the power-factor of the circuit 13.

This progressive pole travel pulls forward the meter disk 26, in the direction of such pole travel. This pull is due to the fact that the eddy currents in the disk around points beneath pole pieces 14 and 15 are in quadrature with the fields of such pole pieces, and therefore in phase with the field at the point 25, with which latter field such eddy currents react; and to the fact that the eddy currents in the disk around a point beneath the point 25 are in quadrature with the field at such point 25, and therefore in phase with the fields of the pole pieces 14 and 15, with which latter fields such eddy currents react. Both of these reactions tend to pull the disk 26 forward, and both of them are proportional to the volt-amperes of the circuit 13.

When no current is passing through the coils 11, but voltage is applied to the windings 19, 20, and 21, the flux produced by the armature in the line between the field-magnet poles will tend to divide. Part of it passes through the coils 11, following the same path taken by the flux produced by such coils when excited. Another part of it, however, tends to pass from one pole piece (say 14) downward through the disk 26 into the member 28, along such member, and back through the disk 26 into the other field-magnet pole pieces (here 15). Since it is generated in the armature in the line between the field-magnet pole pieces, this flux, if not compensated for would be 90° out of phase with the flux passing through the disk 26 below the point 25 and pole member 27, with the result that even without any current-produced field there would be a progressive pole travel such as above refered to, and this progressive pole travel, produced by the voltage coils alone, would cause a torque on the meter disk 26.

To compensate for this effect, I provide coils 40 which may be variously located, as on the pole pieces 14 and 15, as is shown in Fig. 2, or on the end fingers 29 of the member 28, as is shown in Fig. 3. These coils are conveniently connected in series with each other, though not necessarily so; and they are connected to be supplied from a generating coil 41. The coil 41 is arranged to be cut by a flux produced by the armature 16 in the line of the point 25, or in quadrature to that produced by such armature in the line between the two poles of the field-magnet. This is conveniently done by mounting the coil 41 on a middle pole 42 projecting from the cross piece of the field-magnet 10 midway between the main pole pieces, as is clear from the drawing. The voltage induced in the coil 41 will be 90° out of phase with the flux producing it, and since such flux is 90° out of phase with that part of the voltage-produced flux tending to cut the disk at the magnet poles, the voltage and resulting current produced in the coil 41 will be substantially in phase with the latter flux. The voltage produced by the coil 41 is applied to the coils 40, which are wound in the proper direction so that the magneto-motive force thereof is in opposition to that part of the armature flux which tends to cause rotation of the disk with zero current in the field magnet coils. A rheostat 43 in series with the coils 40 and 41 is adjusted so that the magneto-motive force produced by the coils 40 opposes and substantially overcomes the aforesaid armature flux at the field magnet poles. In consequence, substantially no drag is produced on the disk by the application of voltage alone to the meter and the volt-ampere reading is accurate to a very high degree.

I claim as my invention:

1. A volt-ampere meter, comprising a field-magnet, a rotatable armature associated therewith, the windings of said field-magnet and said armature being responsive one to voltage and the other to current, and the windings of the armature being arranged to produce a rotating-field, a movable meter element in position to be acted on by the magnetic fields of both said field-magnet and said armature, the association of said field-magnet and said rotatable armature being such that their relative movement maintains a substantially fixed phase relation between the field flux and the armature flux cutting said meter element, and means for opposing the passage of the armature flux from the pole pieces of the field-magnet into said meter element.

2. A volt-ampere meter, comprising a field-magnet, a rotatable armature associated therewith, the windings of said field-magnet and said armature being responsive one to voltage and the other to current, and the windings of the armature being arranged to produce a rotating-field, a movable meter element in position to be acted on by the magnetic fields of both said field-magnet and said armature, the association of said field-magnet and said rotatable armature being such that their relative movement maintains a substantially fixed phase relation between the field flux and the armature flux cutting said meter element, and means for preventing said meter element from being cut by two armature fluxes in quadrature with each other.

3. A volt-ampere meter, comprising a field-magnet, a rotatable armature associated therewith, the windings of said field-magnet and said armature being responsive one to voltage and the other to current, and the windings of the armature being arranged to produce a rotating-field, a movable meter element in position to be acted on by the magnetic fields of both said field-magnet and said armature, the association of said field-magnet and said rotatable armature being such that their relative movement maintains a substantially fixed phase relation between the field flux and the armature flux cutting said meter element, a generating coil arranged to be excited by armature flux in quadrature with the field-magnet flux, and one or more windings excited from said generating coil and opposing the passage into said meter element of armature flux in phase with said field-magnet flux.

4. A volt-ampere meter, comprising a field-magnet, a rotatable armature associated therewith, the windings of said field-magnet and said armature being responsive one to voltage and the other to current, and the windings of the armature being arranged to produce a rotating-field, a movable meter element in position to be acted on by the magnetic fields of both said field-magnet and said armature, the association of said field-magnet and said rotatable armature being such that their relative movement maintains a substantially fixed phase relation between the field flux and the armature flux cutting said meter element, a generating coil arranged to be excited by flux in quadrature with the field-magnet flux, and one or more windings excited from said generating coil and opposing the passage into said meter element of armature flux in phase with said field-magnet flux.

5. A volt-ampere meter, comprising means for producing two magnetic fields responsive respectively to the voltage and to the current of an alternating-current circuit, at least one of said fields being a rotating field, and for moving the field-producing means of one of said two fields relatively to that of the other on variations in the power-factor of the circuit to substantially maintain a fixed phase relationship between said two fields regardless of such variations; a meter element in position to be acted on by both said fields; and means for substantially preventing said meter element from being cut by two armature fluxes 90° out of phase with each other.

6. A volt-ampere meter, comprising means for producing two magnetic fields responsive respectively to the voltage and to the current of an alternating-current circuit, at least one of said fields being a rotating field, said field-producing means being arranged so that the two magnetic fields react upon each other to produce relative movement of the field-producing means of one of said two fields relatively to that of the other on variations in the power-factor of the circuit to substantially maintain a fixed phase relationship between said two fields regardless of such variations; a meter element in position to be acted on by both said fields; and means for substantially preventing said meter element from being cut by two armature fluxes 90° out of phase with each other.

7. A volt-ampere meter, comprising means for producing two magnetic fields responsive respectively to the voltage and to the current of an alternating-current circuit, at least one of said fields being a rotating field; a meter element in position to have both said fields induce in it currents which react respectively with the other field from that which induces them to produce a pull on such meter element; and means for substantially preventing the induction in said meter element of currents by said rotating field in quadrature with the aforesaid currents induced thereby.

8. A volt-ampere meter, comprising means for producing two magnetic fields responsive respectively to the voltage and to the current of an alternating-current circuit, one of said fields being advanceable and retardable to compensate for variations in the power-factor of said circuit; a meter element in position to be acted on by both said fields; and means for substantially preventing said meter element from being acted on by two fluxes from the same field in quadrature with each other.

9. A volt-ampere meter, comprising relatively movable windings, one of said windings being responsive to voltage and another to current and one of the windings being arranged to produce a shifting field to cause said relative movement, a movable meter element in position to be acted on by the magnetic fields of said windings, the association of said windings being such that relative movement thereof maintains flux from one of the windings cutting said meter element in fixed phase relation to flux from another thereof cutting said meter element, and means for preventing movement of the element when one of the windings is de-energized.

10. A volt-ampere meter, comprising means for producing two magnetic fields responsive respectively to the voltage and to the current of an alternating-current circuit, at least one of said fields being a shifting field, the field-producing means being movable relatively to each other in response to power-factor changes to maintain said fields in fixed-phase relation, and a meter element in position to be acted on by said fields and movable only in response to the co-operative effect thereof.

11. A volt-ampere meter comprising a winding energized and affected only in proportion to the voltage of a circuit, a winding energized and affected only in proportion to the current of said circuit, a movable meter element, said windings and element having direct interacting flux relation and being constructed and related to maintain fluxes of the windings for actuating the meter element in fixed phase relation irrespective of changes in the phase relation between the currents traversing the windings and means for preventing movement of the element when one of the windings is de-energized.

In witness whereof, I have hereunto set my hand at Indianapolis, Indiana, this 25th day of January, A. D. one thousand nine hundred and twenty-two.

DONALD J. ANGUS.